United States Patent
Watanabe et al.

(10) Patent No.: US 10,406,765 B2
(45) Date of Patent: Sep. 10, 2019

(54) FIBER-REINFORCED POLYIMIDE RESIN MOLDED ARTICLE AND PRODUCTION PROCESS THEREFOR

(71) Applicant: TOYO SEIKAN GROUP HOLDINGS, LTD., Tokyo (JP)

(72) Inventors: Kazunobu Watanabe, Yokohama (JP); Toshinori Enokido, Yokohama (JP); Kouta Segami, Yokohama (JP); Yuusuke Kobayashi, Yokohama (JP)

(73) Assignee: TOYO SEIKAN GROUP HOLDINGS, LTD., Tokyo (JP)

( * ) Notice: Subject to any disclaimer, the term of this patent is extended or adjusted under 35 U.S.C. 154(b) by 0 days.

(21) Appl. No.: 15/510,352

(22) PCT Filed: Sep. 14, 2015

(86) PCT No.: PCT/JP2015/076074
§ 371 (c)(1),
(2) Date: Mar. 10, 2017

(87) PCT Pub. No.: WO2016/039485
PCT Pub. Date: Mar. 17, 2016

(65) Prior Publication Data
US 2017/0252986 A1 Sep. 7, 2017

(30) Foreign Application Priority Data

Sep. 12, 2014 (JP) .................................. 2014-186941
Sep. 12, 2014 (JP) .................................. 2014-186942

(51) Int. Cl.
*B29C 70/42* (2006.01)
*B29B 7/90* (2006.01)
(Continued)

(52) U.S. Cl.
CPC .............. *B29C 70/42* (2013.01); *B29B 7/005* (2013.01); *B29B 7/286* (2013.01); *B29B 7/90* (2013.01);
(Continued)

(58) Field of Classification Search
CPC ......... B29C 70/42; B29C 43/02; B29B 7/005; B29B 7/286; B29B 7/90; B29B 7/06;
(Continued)

(56) References Cited

U.S. PATENT DOCUMENTS 5,138,028 A * 8/1992 Paul ...................... C08G 73/101
257/E23.119
5,312,866 A * 5/1994 Tsutsumi ................ C08L 67/00
524/600
(Continued)

FOREIGN PATENT DOCUMENTS

| JP | 6-240233 A | 8/1994 |
| JP | 8-269327 A | 10/1996 |

(Continued)

OTHER PUBLICATIONS

Toray T300 Carbon Fiber material data sheet, accessed online Nov. 7, 2018.*

(Continued)

*Primary Examiner* — Camie S Thompson
(74) *Attorney, Agent, or Firm* — Sughrue Mion, PLLC

(57) ABSTRACT

A fiber-reinforced polyimide resin molded article and a production process therefor. After a prepolymer of an addition reaction type polyimide resin and functional fibers are dispersed and kneaded together, the kneaded product is kept at a temperature not lower than the heat curing start temperature of the reaction type polyimide resin for a fixed amount of time or mixed with a thickener to increase its viscosity, and shaped at a temperature not lower than the (Continued)

heat curing start temperature of the reaction type polyimide resin to obtain a molded article having excellent sliding performance with a limit PV value of not less than 3,000 kPa·m/s and excellent shape stability during molding and containing the functional fibers dispersed in the polyimide resin.

14 Claims, 6 Drawing Sheets

(51) Int. Cl.
    *B29C 43/02*     (2006.01)
    *C08J 5/04*     (2006.01)
    *B29B 7/00*     (2006.01)
    *B29B 7/28*     (2006.01)
    *C08K 7/06*     (2006.01)
    *B29K 79/00*     (2006.01)
    *B29K 105/12*     (2006.01)
    *B29B 7/82*     (2006.01)

(52) U.S. Cl.
    CPC .............. *B29C 43/02* (2013.01); *C08J 5/04* (2013.01); *C08J 5/042* (2013.01); *C08K 7/06* (2013.01); *B29B 7/82* (2013.01); *B29K 2079/08* (2013.01); *B29K 2105/12* (2013.01); *C08J 2379/08* (2013.01)

(58) Field of Classification Search
    CPC ...... B29B 7/82; C08J 5/04; C08J 5/042; C08J 2379/08; C08J 5/24; C08K 7/06; B29K 2079/08; B29K 2105/12; B29K 79/08; C08L 79/08; C08G 73/101; C08G 73/1089; D01F 9/145; Y10T 428/24994

USPC .......... 428/292.1, 297.4, 367, 408; 526/262; 525/426

See application file for complete search history.

(56) References Cited

U.S. PATENT DOCUMENTS

| | | | |
|---|---|---|---|
| 7,651,767 B2 | 1/2010 | Hirata et al. | |
| 7,767,302 B2 | 8/2010 | Hirata et al. | |
| 2010/0104846 A1* | 4/2010 | Sano | ........................ D01F 9/145 428/297.4 |
| 2011/0028595 A1 | 2/2011 | Ozawa et al. | |

FOREIGN PATENT DOCUMENTS

| | | | |
|---|---|---|---|
| JP | 2003-526704 A | | 9/2003 |
| JP | 2009-242656 A | | 10/2009 |
| JP | 4538502 B2 | | 9/2010 |
| JP | 2011-057947 | * | 3/2011 |
| JP | 2011-127636 A | | 6/2011 |
| JP | 2011-132168 A | | 7/2011 |
| WO | 95/20005 A1 | | 7/1995 |
| WO | 2013/171325 A1 | | 11/2013 |

OTHER PUBLICATIONS

Communication dated Apr. 30, 2018 from the European Patent Office in counterpart Application No. 15839594.7.
International Search Report for PCT/JP2015/076074 dated Dec. 22, 2015 [PCT/ISA/210].

* cited by examiner

Fig. 4

| | Ex. 1 | Ex. 2 | Ex. 3 | Ex. 4 | Comp. Ex. 1 | Comp. Ex. 2 |
|---|---|---|---|---|---|---|
| Parts by weight of fibers | 11.1 | 42.9 | 100.0 | 11.1 | 0.0 | 233.0 |
| Limit PV value [kPa·m/s] | 4000 | 5000 | 4250 | 3500 | 1250 | 3250 |
| Existence of thickening step | *1 ※ | *2 | *2 | *2 | *2 | *2 |
| Uneven distribution of fibers | ○ *3 | ○ *3 | ○ *3 | × *4 | – | ○ *3 |
| Defect in molded | ○ none | ○ none | ○ none | ○ none | ○ none | × *5 |

※ existence of thickening at 310℃ for 30 minutes in the electric furnace before compression molding

*1: existence, *2: nonexistence, *3: not seen,
*4: seen (warpage), *5: existence (stretch failure)

Fig. 5

| | Comp. Ex. 3 | Ex. 1 | Ex. 5 | Ex. 6 | Comp. Ex. 4 |
|---|---|---|---|---|---|
| Photo of cross section of molded article | | | | | |
| *1 ※ | 15 | 30 | 45 | 60 | 75 |
| *2 | × <10 | ○ 25 | ○ 35 | ○ 133 | — *3 |
| Shapability | × leakage | ○ | ○ | ○ | × *4 |
| *5 | × *6 | ○ *7 | ○ *7 | ○ *7 | — |
| *8 | × 2.29 | ○ 1.01 | ○ 0.64 | ○ 0.23 | — |

※ time of holding at 310°C in the electric furnace in the thickening step

*1: Holding time (minutes), *2: Melt viscosity (Pa・s),
*3: unmeasurable, *4: not shapable.
*5: Uneven distribution of fibers, *6: existence,
*7: nonexistence, *8: Warpage/diameter ratio (%)

Fig. 6

|  | Ex. 7 | Ex. 8 | Ex. 9 | Ex. 10 | Ex. 11 | Comp. Ex. 5 | Ex. 4 |
|---|---|---|---|---|---|---|---|
| Parts by weight of fibers | 12.5 | 28.6 | 28.6 | 14.3 | 33.3 | 0.0 | 11.1 |
| Parts by weight of thickener | 12.5 *1 | 14.3 *1 | 14.3 PTFE | 28.6 PTFE | 33.3 PTFE | 0.0 | 0.0 |
| Limit PV value [kPa·m/s] | 3500 | 4250 | 7000 | 7000 | 6000 | 1250 | 3500 |
| Dispersion of fibers | ○ | ○ | ○ | ○ | ○ | - | × |

*1: graphite

Fig. 7

|  | Ex. 7 | Ex. 8 | Ex. 12 | Ex. 9 | Ex. 4 | Comp. Ex. 6 |
|---|---|---|---|---|---|---|
| Parts by weight of fibers | 12.5 | 28.6 | 14.3 | 28.6 | 11.1 | 16.7 |
| Parts by weight of thickener | 12.5 *1 | 14.3 *1 | 28.6 *1 | 14.3 PTFE | 0.0 | 50.0 |
| Melt viscosity [Pa·s] | 10.6 | 71.1 | 105.3 | 3224 | <10 | 7360 |
| Shapability | ○ | ○ | ○ | ○ | × leaked | × *2 |
| Dispersion of fibers | ○ | ○ | ○ | ○ | × | ○ |
| Warpage/diameter ratio (%) | 0.80 | 0.44 | 0.38 | 0.31 | ≧1.5 | 0.18 |

*1: graphite, *2: air bubbles

FIBER-REINFORCED POLYIMIDE RESIN MOLDED ARTICLE AND PRODUCTION PROCESS THEREFOR

CROSS REFERENCE TO RELATED APPLICATIONS

This application is a National Stage of International Application No. PCT/JP2015/076074, filed on Sep. 14, 2015, which claims priority from Japanese Patent Application Nos. 2014-186941 and 2014-186942, both filed on Sep. 12, 2014, the contents of all of which are incorporated herein by reference in their entirety.

TECHNICAL FIELD

The present invention relates to a fiber-reinforced polyimide resin molded article and a production process therefor and, more specifically, to a molded article having excellent sliding performance and excellent shape stability during molding and containing functional fibers dispersed in a polyimide resin and to a production process therefor.

BACKGROUND ART

Molded articles made of a fiber-reinforced resin obtained by mixing functional fibers such as carbon fibers with a resin are widely used in transportation equipment materials for automobiles and aircrafts, civil engineering and construction materials and sports goods since they are excellent in characteristic properties such as weatherability, mechanical strength and durability.

For example, Patent Document 1 below discloses a carbon fiber-reinforced resin molded article containing a specific pitch-based carbon short fiber mixture and a matrix resin and teaches that it is advantageously used in various electronic parts.

Patent Document 2 below proposes a friction material made of a resin composition for friction materials containing a specific aromatic polyimide oligomer as a binder for carbon fibers. Patent Document 2 teaches that the heat resistance and mechanical properties of the binder itself are excellent and moldability is high in this friction material as compared with a case where a phenol resin which has been advantageously used as a binder for friction materials is used.

Further, Patent Document 3 below proposes a rolling body made of a carbon fiber-reinforced synthetic resin containing 10 to 70 wt % of carbon fibers having a specific thermal conductivity.

When this fiber-reinforced resin molded article is used as a sliding member such as a bearing, characteristic properties including high mechanical strength such as strength and stiffness, a small dynamic friction coefficient, a small wear volume and further a large limit PV value are required, and it is desired that an addition reaction type polyimide resin which is excellent in mechanical strength, heat resistance and durability as well as the impregnation property of a resin should be used as a matrix resin.

There is also proposed a highly functional addition reaction type polyimide resin which makes it possible to produce a carbon fiber-reinforced composite by transfer molding (RTM) and resin injection (RI) as an addition reaction type polyimide resin (Patent Document 4).

PRIOR ART DOCUMENTS

Patent Documents

Patent Document 1: Japanese Patent No. 4538502
Patent Document 2: JP-A 2009-242656
Patent Document 3: JP-A 2011-127636
Patent Document 4: JP-B 2003-526704

DISCLOSURE OF THE INVENTION

Problem to be Solved by the Invention

However, when an addition reaction type polyimide resin is used as a matrix resin for a fiber-reinforced resin molded article, even if excellent heat resistance, durability and mechanical strength are obtained, there is a problem that the obtained molded article warps and cannot be put to practical use as a sliding member.

The inventors of the present invention conducted intensive studies to find this cause and found the following fact. That is, it was found that, since the addition reaction type polyimide resin which may be advantageously used as a matrix resin for functional fibers such as carbon fibers has a low melt viscosity in a prepolymer state, when the prepolymer is mixed with functional fibers, the functional fibers precipitate and are unevenly distributed in the prepolymer, whereby when the resin is crosslinked and cured in this state, the shrinkage of the molded article varies according to the amount of the functional fibers, thereby causing the warpage of the obtained fiber-reinforced resin molded article.

It is therefore an object of the present invention to provide a fiber-reinforced polyimide resin molded article which has excellent sliding performance and shape stability during molding and does not warp.

It is another object of the present invention to provide a production process capable of molding a fiber-reinforced polyimide resin molded article having excellent sliding performance with high shape stability.

Means for Solving the Problem

According to the present invention, there is provided a resin molded article containing functional fibers dispersed in an addition reaction type polyimide resin and having a limit PV value of not less than 3,000 kPa·m/s.

In the resin molded article of the present invention, preferably,
1. the matrix of a composition constituting the resin molded article is an addition reaction type polyimide resin, and the above functional fibers are impregnated with the polyimide resin;
2. the above functional fibers are contained in an amount of 5 to 200 parts by weight based on 100 parts by weight of the addition reaction type polyimide;
3. the above functional fibers are at one member selected from carbon fibers, glass fibers, aramid fibers and metal fibers;
4. the above functional fibers are carbon fibers having an average fiber length of 50 to 6,000 μm and an average fiber diameter of 5 to 20 μm;
5. a thickener is contained in an amount of 5 to 40 parts by weight based on 100 parts by weight of the addition reaction type polyimide and dispersed in the resin molded article; and
6. the above thickener is at least one member selected from graphite, molybdenum disulfide, PTFE (ethylene tetrafluoride resin), fine carbon-based materials and metal powders.

According to the present invention, there is provided a process for producing a resin molded article, comprising at least the steps of:

dispersing and kneading a prepolymer of an addition reaction type polyimide resin and functional fibers at a temperature not lower than the melting point (160 to 170° C.) of the addition reaction type polyimide resin and not higher than the heat curing start temperature (around 300° C.) of the resin; and shaping the resulting mixture at a temperature not lower than the heat curing start temperature of the addition reaction type polyimide resin.

In the above first process for producing the resin molded article of the present invention, preferably, 1. the step of increasing the viscosity of the kneaded product obtained in the dispersion and kneading step by keeping the kneaded product at a temperature not lower than the heat curing start temperature of the addition reaction type polyimide resin for a fixed amount of time is provided between the above dispersion and kneading step and the above shaping step;
2. the content of the above functional fibers is 5 to 200 parts by weight based on 100 parts by weight of the addition reaction type polyimide;
3. the melt viscosity of the mixture obtained after the dispersion and kneading step is 10 to 5,000 Pa·s at a temperature of 300 to 320° C., and the mixture is pressure shaped after it is cooled, pulverized, mixed;
4. the melt viscosity of the mixture is adjusted to 10 to 5,000 Pa·s at a temperature of 300 to 320° C. in the above thickening step;
5. the above addition reaction type polyimide resin is a polyimide resin having a phenylethynyl group as an addition reactive group; and
6. when the above addition reaction type polyimide resin is a polyimide resin having a phenylethynyl group as an addition reactive group, the kneaded product is kept at a temperature of 310±10° C. for 30 to 60 minutes in the above thickening step.

According to the present invention, there is further provided a process for producing a resin molded article containing 5 to 200 parts by weight of functional fibers and 5 to 40 parts by weight of a thickener dispersed in 100 parts by weight of an addition reaction type polyimide, comprising the steps of:

dispersing and kneading a prepolymer of the above addition reaction type polyimide resin, the functional fibers and the thickener at a temperature not lower than the melting point of the addition reaction type polyimide resin and not higher than the heat curing start temperature of the resin; and pressure shaping the mixture obtained after the dispersion and kneading step at a temperature not lower than the heat curing start temperature of the addition reaction type polyimide resin.

In the above second process for producing the resin molded article of the present invention, the melt viscosity of the mixture obtained after the dispersion and kneading step is 10 to 5,000 Pa·s at a temperature of 300 to 320° C.

In the process for producing the resin molded article of the present invention, the above shaping step is preferably carried out by compression molding.

Effect of the Invention

In the fiber-reinforced polyimide resin molded article of the present invention, the addition reaction type polyimide resin having excellent heat resistance, durability and mechanical strength is used as a matrix resin, and 5 to 200 parts by weight of the functional fibers is mixed with 100 parts by weight of this addition reaction type polyimide, thereby making it possible to achieve excellent sliding performance with a limit PV value of not less than 3,000 kPa·m/s. In addition, since the fiber-reinforced polyimide resin is crosslinked and cured to be molded while the functional fibers are uniformly dispersed in the molded article, the molded article is free from distortion such as warpage and can be advantageously used as a sliding member. The limit PV value is a value obtained by the product of a surface pressure P and a velocity V when frictional force sharply rises and generally calculated as an index for judging whether a molded article is suitable for a use environment as a sliding member or not. Rises in dynamic friction coefficient and the temperature of a sample caused by the melting or burning of a resin with the friction heat of a sliding surface and the abnormal abrasion of a material are observed under a condition close to the limit PV value, and this limit PV value being large means that sliding performance is high. The fiber-reinforced polyimide resin molded article of the present invention contains the addition reaction type polyimide impregnated into the functional fibers and a predetermined amount of the functional fibers, has excellent sliding performance, retains this performance stably for a long time when it is used as a sliding member, and makes it possible to prevent deformation caused by warpage, whereby it has excellent productivity, makes it possible to reduce a change in PV value caused by abrasion during long-time use and facilitates the management of replacement timing and equipment.

In the first process for producing the fiber-reinforced polyimide resin molded article of the present invention, the thickening step for increasing the viscosity of the prepolymer (imide oligomer) of the polyimide resin in a molten state is provided after the step of dispersing and kneading the addition reaction type polyimide resin and the functional fibers, thereby making it possible to keep the functional fibers uniformly dispersed in the prepolymer and to mold without causing warpage deformation the fiber-reinforced polyimide resin molded article containing the functional fibers uniformly dispersed without being precipitated and unevenly distributed.

Further, in the second process for producing the fiber-reinforced polyimide resin molded article of the present invention, since 5 to 200 parts by weight of the functional fibers and 5 to 40 parts by weight of the thickener were mixed with 100 parts by weight of the addition reaction type polyimide, it is possible to adjust the melt viscosity of the mixture after the dispersion and kneading step to 10 to 5,000 Pa·s at a temperature of 300 to 320° C. without the thickening step. Thereby, the functional fibers can be kept uniformly dispersed in the prepolymer, and the fiber-reinforced polyimide resin molded article containing the functional fibers uniformly dispersed therein can be molded without warpage deformation.

The thickener preferably used in the present invention has excellent slidability and can further improve sliding performance as will be described hereinafter.

BRIEF DESCRIPTION OF THE DRAWINGS

FIG. 4 is a table of measurement results for Examples 1 to 4 and Comparative Examples 1 and 2:

FIG. 5 is a table of measurement results for Examples 1, 5 and 6 and Comparative Example 4;

FIG. 6 is a table of measurement results for Examples 4 and 7 to 11 and Comparative Example 5; and FIG. 7 is a table of measurement results for Examples 4, 7, 8, 9 and 12 and Comparative Example 6.

Figure 1:
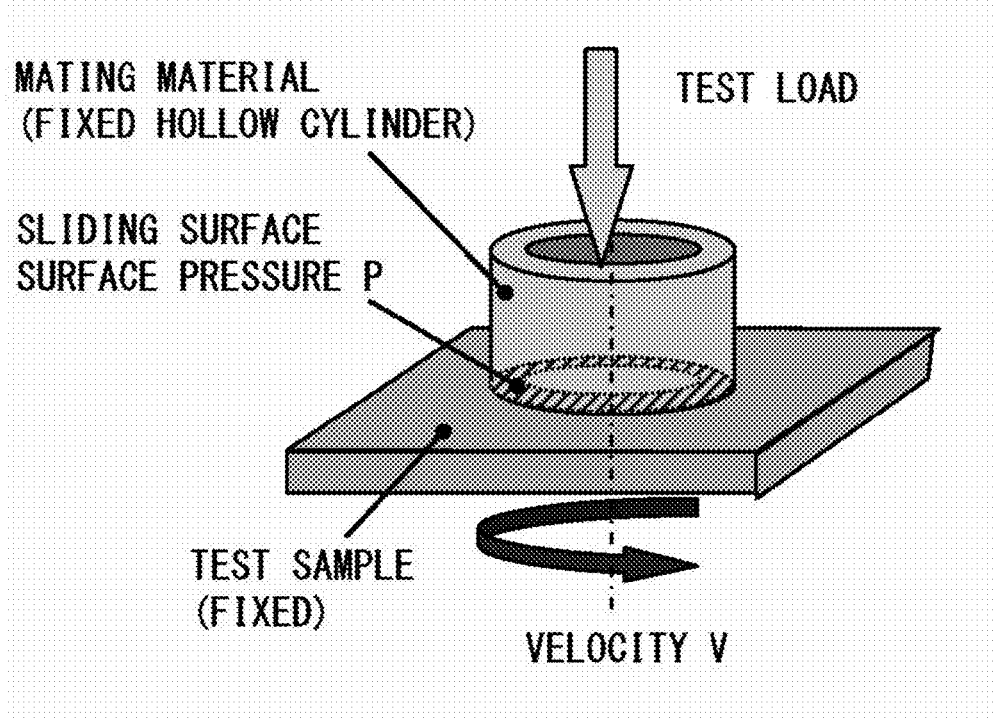
FIG. 1 is a diagram for explaining the method of measuring the limit PV value in Examples.

BEST MODE FOR CARRYING OUT THE INVENTION (Resin Molded Article)

The fiber-reinforced polyimide resin molded article of the present invention is a resin molded article containing functional fibers dispersed in an addition reaction type polyimide resin which will be described hereinafter and has an important feature that it has a limit PV value of not less than 3,000 kPa·m/s as well as heat resistance, durability, mechanical strength and excellent sliding performance with a large limit PV value.

[Addition Reaction Type Polyimide Resin]

In the present invention, it is an important feature that an addition reaction type polyimide resin is used as a polyimide resin which becomes the matrix of a composition constituting the fiber-reinforced polyimide resin molded article.

The addition reaction type polyimide resin used in the present invention is composed of an aromatic polyimide oligomer having an addition reactive group at the end and prepared by a conventionally known production process. For example, it can be easily obtained by using an aromatic tetracarboxylic dianhydride, an aromatic diamine and a compound having an addition reactive group and an anhydride group or an amino group in the molecule to ensure that the total of the equivalents of acid groups becomes almost equal to the total of the equivalents of amino groups and reacting them preferably in a solvent. Examples of the reaction method include one in which polymerization is carried out at 100° C. or lower, preferably 80° C. or lower for 0.1 to 50 hours to produce an oligomer having an amide acid bond and then the oligomer is chemically imidized with an imidizing agent, one comprising two steps of heating at 140 to 270° C. and thermally imidizing, and one comprising only one step of carrying out a polymerization/imidizing reaction at 140 to 270° C. for 0.5 to 50 hours.

Preferred examples of the solvent used in these reactions include, but not limited to, organic polar solvents such as N-methyl-2-pyrrolidone, N,N-dimethyl formamide, N,N-dimethyl acetamide, N,N-diethyl acetamide, γ-butyrolactone and N-methyl caprolactam.

In the present invention, the addition reactive group at the end of the aromatic imide oligomer is not particularly limited if it is a group which carries out a curing reaction (addition polymerization reaction) by heating when a resin molded article is to be produced. When it is taken into consideration that a curing reaction can be preferably carried out and the obtained cured product has high heat resistance, the addition reactive group is preferably a reactive group selected from the group consisting of phenylethynyl group, acetylene group, nadic acid group and maleimide group, out of which a phenylethynyl group is particularly preferred as a gas component is not produced by a curing reaction and the obtained resin molded article has excellent heat resistance and mechanical strength.

These addition reactive groups are introduced to the end of the aromatic imide oligomer by a reaction in which the compound having an addition reactive group and an anhydride group or an amino group in the molecule forms preferably an imide ring with the amino group or acid anhydride group at the end of the aromatic imide oligomer.

The compound having an anhydride group or an amino group together with the addition reactive group in the molecule is preferably 4-(2-phenylethynyl)phthalic anhydride, 4-(2-phenylethynyl)aniline, 4-ethynyl-phthalic anhydride, 4-ethynylaniline, nadic anhydride or maleic anhydride.

The tetracarboxylic acid component forming the aromatic imide oligomer having an addition reactive group at the end is at least one tetracarboxylic dianhydride selected from the group consisting of 2,3,3',4'-biphenyltetracarboxylic dianhydride, 2,2',3,3'-biphenyltetracarboxylic dianhydride, 3,3',4,4'-biphenyltetracarboxylic dianhydride and 3,3',4,4'-benzophenonetetracarboxylic dianhydride, particularly preferably 2,3,3',4'-biphenyltetracarboxylic dianhydride.

Examples of the diamine component forming the aromatic imide oligomer having an addition reactive group at the end include, but not limited to, amines having one benzene ring such as 1,4-diaminobenzene, 1,3-diaminobenzene, 1,2-diaminobenzene, 2,6-diethyl-1,3-diaminobenzene, 4,6-diethyl-2-methyl-1,3-diaminobenzene, 3,5-diethyltoluene-2,4-diamine and 3,5-diethyltoluene-2,6-diamine, diamines having two benzene rings such as 4,4'-diaminodiphenyl ether, 3,4'-diaminodiphenyl ether, 3,3'-diaminodiphenyl ether, 3,3'-diaminobenzophenone, 4,4'-diaminobenzophenone, 4,4'-diaminodiphenylmethane, 3,3'-diaminodiphenylmethane, bis(2,6-diethyl-4-aminophenoxy)methane, bis(2-ethyl-6-methyl-4-aminophenyl)methane, 4,4'-methylene-bis(2,6-diethylaniline), 4,4'-methylene-bis(2-ethyl, 6-methylaniline), 2,2-bis(3-aminophenyl)propane, 2,2-bis(4-aminophenyl)propane, benzidine, 2,2'-bis(trifluoromethyl)benzidine, 3,3'-dimethylbenzidine, 2,2-bis(4-aminophenyl)propane and 2,2-bis(3-aminophenyl)propane, diamines having three benzene rings such as 1,3-bis(4-aminophenoxy)benzene, 1,3-bis(3-aminophenoxy)benzene, 1,4-bis(4-aminophenoxy)benzene and 1,4-bis(3-aminophenoxy)benzene, and diamines having four benzene rings such as 2,2-bis[4-[4-aminophenoxy]phenyl]propane and 2,2-bis[4-[4-aminophenoxy]phenyl]hexafluoropropane. They may be used alone or in combination of two or more.

A mixed diamine composed of at least two aromatic diamines selected from the group consisting of 1,3-diaminobenzene, 1,3-bis(4-aminophenoxy)benzene, 3,4'-diaminodiphenyl ether, 4,4'-diaminodiphenyl ether and 2,2'-bis(trifluoromethyl)benzidine out of these is preferred, and a mixed diamine composed of 1,3-diaminobenzene and 1,3-bis(4-aminophenoxy)benzene, a mixed diamine composed of 3,4'-diaminodiphenyl ether and 4,4'-diaminodiphenyl ether, a mixed diamine composed of 3,4'-diaminodiphenyl ether and 1,3-bis(4-aminophenoxy)benzene, a mixed diamine composed of 4,4'-diaminodiphenyl ether and 1,3-bis(4-aminophenoxy)benzene and a mixed diamine composed of 2,2'-bis(trifluoromethyl)benzidine and 1,3-bis(4-aminophenoxy)benzene are particularly preferably used from the viewpoints of heat resistance and moldability.

The number of the recurring units of the aromatic imide oligomer having an addition reactive group at the end used in the present invention is more than 0 and not more than 20, particularly preferably 1 to 5. The number average molecular weight measured by GPC in terms of styrene of the aromatic imide oligomer is 10,000 or less, particularly preferably 3,000 or less. When the number of the recurring units falls within the above range, the melt viscosity is adjusted to a suitable range, thereby making it possible to mix the functional fibers uniformly. Further, the aromatic imide oligomer makes it possible to provide a resin molded article which has such high moldability that it does not need to be molded at a high temperature and excellent heat resistance and mechanical strength.

The control of the number of recurring units can be carried out by changing the ratio of the aromatic tetracarboxylic dianhydride, the aromatic diamine and the compound having an addition reactive group and an anhydride group or an amino group in the molecule. When the proportion of the compound having an addition reactive group and an anhydride group or an amino group in the molecule is increased, the molecular weight of the oligomer becomes lower with a reduction in the number of recurring units and when the proportion of the above compound is reduced, the molecular weight of the oligomer becomes higher with an increase in the number of recurring units.

The addition reaction type polyimide resin may be mixed with resin additives such as a flame retardant, coloring agent, lubricant, heat stabilizer, optical stabilizer, ultraviolet absorbent and filler based on known formulation according to the application purpose of a resin molded article of interest.

[Functional Fibers]

In the present invention, as the functional fibers to be dispersed in the above-described addition reaction type polyimide resin, conventionally known functional fibers such as carbon fibers, aramid fibers, glass fibers and metal fibers may be used, out of which carbon fibers are preferably used.

Carbon fibers having an average fiber length of 50 to 6,000 μm and an average fiber diameter of 5 to 20 μm may be particularly preferably used. When the average fiber length falls below the above range, the effect of the carbon fibers as a reinforcing material may not be fully obtained and when the average fiber length exceeds the above range, the dispersibility in the polyimide resin of the fibers deteriorates. When the average fiber diameter falls below the above range, the fibers deteriorate in handling properties and are expensive and when the average fiber diameter exceeds the above range, the precipitation rate of the functional fibers increases, the functional fibers may be unevenly distributed, and the strength of the fibers is apt to lower, whereby the effect of the fibers as a reinforcing material may not be fully obtained.

The total content of the functional fibers has a great influence upon the sliding performance of the resin molded article and the occurrence of warpage during molding. In the present invention, when the functional fibers are contained in an amount of 5 to 200 parts by weight, specifically 10 to 150 parts by weight based on 100 parts by weight of the addition reaction type polyimide, a molded article having excellent sliding performance and excellent shape stability without warpage is obtained advantageously. When the total content of the functional fibers falls below the above range, the limit PV value becomes smaller than the above value, whereby slidability may lower. Also, probability that the warpage of the resin molded article occurs may increase. When the total content of the functional fibers exceeds the above range, the limit PV value may become smaller than the value obtained when the total content falls within the above range. Further, excessive thickening occurs, whereby shaping may not be carried out.

In the present invention, at least one inorganic material selected from fine carbon-based materials such as carbon black and metal powders such as aluminum powders and copper powders may be used in combination with the above functional fibers.

The above inorganic material is preferably contained in an amount of 5 to 40 parts by weight based on 100 parts by weight of the addition reaction type polyimide.

[Thickener]

In the present invention, when the thickener is used in combination with the functional fibers in an amount of 5 to 40 parts by weight based on 100 parts by weight of the addition reaction type polyimide, the viscosity of the prepolymer of the addition reaction type polyimide resin can be increased without the thickening step, whereby the functional fibers can be kept uniformly dispersed in the prepolymer without precipitation.

As the thickener, graphite, molybdenum disulfide, PTFE (ethylene tetrafluoride resin), magnesium oxide, magnesium hydroxide and calcium hydroxide may be used, and graphite, molybdenum disulfide and PTFE are particularly preferred as they further improve sliding performance.

The thickener is preferably contained in an amount of 5 to 40 parts by weight based on 100 parts by weight of the addition reaction type polyimide as described above. When the amount of the thickener falls below the above range, the viscosity of the prepolymer does not increase fully and the precipitation of the functional fibers cannot be completely suppressed, whereby a resin molded article free from warpage deformation and containing the functional fibers uniformly dispersed therein cannot be molded. When the amount of the thickener exceeds the above range, sliding performance may be impaired with the result of an increase in friction coefficient and a reduction in abrasion resistance.

(First Production Process of Resin Molded Article)

The first process for producing the resin molded article of the present invention comprises at least the steps of:

(A) dispersing and kneading a prepolymer (imide oligomer) of an addition reaction type polyimide resin and functional fibers at a temperature not lower than the melting point of the addition reaction type polyimide resin and not higher than the heat curing start temperature of the resin; and (C) pressure shaping the mixture obtained after the dispersion and kneading step at a temperature not lower than the heat curing start temperature of the reaction type polyimide resin, and (B) the step of increasing the viscosity of the kneaded product obtained from the dispersion and kneading step as required by keeping the kneaded product at a temperature not lower than the heat curing start temperature of the reaction type polyimide resin for a fixed amount of time so as to adjust the viscosity of the kneaded product to a suitable range is provided between the above dispersion and kneading step (A) and the above shaping step (C) as required.

As described above, since the addition reaction type polyimide resin used to mold the resin molded article of the present invention has a low viscosity when it is a prepolymer before crosslinking and curing, when the functional fibers are contained in the resin, they precipitate with the result that the functional fibers are unevenly distributed and the molded article warps. In the first production process of the present invention, the precipitation of the functional fibers is prevented by increasing the viscosity of the prepolymer in the above thickening step (B) after the above dispersion and kneading step (A), and the kneaded product is shaped in the shaping step (C) while this state is maintained, whereby the functional fibers are uniformly dispersed and uniformly shrunk at the time of heat curing, thereby making it possible to mold a molded article free from warpage.

[Dispersion and Kneading Step]

The prepolymer (imide oligomer) of the addition reaction type polyimide resin and the functional fibers are heated at a temperature not lower than the melting point of the addition reaction type polyimide resin and kneaded together while the prepolymer is molten to be mixed together. At this point, as described above, 5 to 200 parts by weight, specifically 10 to 150 parts by weight of the functional fibers are used based on 100 parts by weight of the addition reaction type polyimide. Further, the above-described inorganic material may be used in the above-described amount. Although not particularly essential, the above-described thickener may be mixed in the above-described amount.

The prepolymer and the functional fibers may be kneaded together by using a conventionally known mixer such as a Henschel mixer, tumbler mixer or ribbon blender. However, since it is important that the functional fibers should not be broken and should be uniformly dispersed, a batch type pressure kneader (kneading machine) is particularly preferably used.

It is desired in the present invention that the mixture of the prepolymer and the functional fibers after the dispersion and kneading step should be cooled to be solidified and split into a massive material having a predetermined size. Thereby, the mixture containing the functional fibers dispersed in the prepolymer can be stored for a long time, and handling properties are improved.

[Thickening Step]

Then, when the melt viscosity at a temperature of 300 to 320° C. of the mixture of the prepolymer and the functional fibers which have been melt kneaded together is not more than 10 Pa·s, the mixture is kept at a temperature of 310±10° C. close to the heat curing start temperature of the polyimide resin used in the mixture for 30 to 60 minutes so as to adjust the melt viscosity at a temperature of 300 to 320° C. to 10 to 5,000 Pa·s.

That is, the prepolymer is crosslinked gradually by keeping the mixture of the prepolymer and the functional fibers at a temperature of 310±10° C. for 30 to 60 minutes in an electric furnace, thereby increasing the viscosity. Further, the functional fibers impregnated with the prepolymer in the above dispersion and kneading step can be kept dispersed in the prepolymer without precipitation due to this rise in viscosity. By setting the heating temperature and the holding time to the above ranges, only the viscosity can be raised to the above range without completely crosslinking and curing the prepolymer. Therefore, the thickening step is carried out at a temperature not lower than the heat curing start temperature of the prepolymer and lower than a temperature at which the prepolymer is completely crosslinked and cured.

The reaction start temperature of the addition reaction type polyimide resin depends on the addition reactive group, and the polyimide resin having a phenylethynyl group as a preferred addition reactive group in the present invention is desirably heated at a temperature of 310±10° C. which is close to the heat curing start temperature for 30 to 60 minutes.

[Shaping Step]

The mixture of the prepolymer and the functional fibers, whose melt viscosity has been adjusted to the above range in the thickening step, is shaped into a resin molded article having a desired shape at a temperature not lower than the heat curing start temperature of the polyimide resin in use.

To carry out the shaping step, the mixture of the polyimide prepolymer and the functional fibers, which is in a molten state with a viscosity within the above range, is introduced into a mold and heated and pressurized at a temperature not lower than the heat curing start temperature to be cured so as to mold a resin molded article.

Although shaping is preferably carried out by compression molding or transfer molding in which the mixture introduced into the mold is pressure compressed and molded, injection molding or extrusion molding may also be employed.

(Second Production Process of Resin Molded Article)

The second process for producing the resin molded article of the present invention comprises:

dispersing and kneading 100 parts by weight of the prepolymer (imide oligomer) of the addition reaction type polyimide resin, 5 to 200 parts by weight of the functional fibers and 5 to 40 parts by weight of the thickener at a temperature not lower than the melting point of the addition reaction type polyimide resin and not higher than the heat curing start temperature of the resin; and pressure shaping the mixture after the dispersion and kneading step at a temperature not lower than the heat curing start temperature of the reaction type polyimide resin.

Since the addition reaction type polyimide resin used to mold the molded article of the present invention has a low viscosity in a prepolymer state before crosslinking and curing as described above, when the functional fibers are contained, they precipitate with the result that the functional fibers are unevenly distributed and the molded article warps. In the second production process of the present invention, by mixing the functional fibers and a predetermined amount of the thickener with the prepolymer, the viscosity of the prepolymer can be increased without the thickening step with the result that the functional fibers are dispersed in the prepolymer without precipitation and the mixture is shaped in the shaping step while the functional fibers are kept dispersed, thereby making it possible to mold a molded article free from warpage as it shrinks uniformly at the time of heat curing.

[Dispersion and Kneading Step]

The prepolymer (imide oligomer) of the addition reaction type polyimide resin, the functional fibers and the thickener are heated at a temperature not lower than the melting point of the addition reaction type polyimide resin to melt the prepolymer and kneaded together to mix the prepolymer and the functional fibers. At this point, as described above, 5 to 200 parts by weight, specifically 10 to 150 parts by weight of the functional fibers and 5 to 40 parts by weight of the thickener are used based on 100 parts by weight of the addition reaction type polyimide.

The prepolymer and the functional fibers may be kneaded together in the same manner as in the above-described first production process.

In this mode, the temperature of the dispersion and kneading step is not lower than the melting point of the prepolymer and not higher than the crosslinking and curing temperature, particularly preferably a temperature at which the mixture after the dispersion and kneading step has a melt viscosity of 10 to 5,000 Pa·s at a temperature of 300 to 320° C. This rise in viscosity and the permeation of the prepolymer into the functional fibers are combined to make the functional fibers kept dispersed in the prepolymer without precipitation.

After the mixture of the prepolymer, the functional fibers and the thickener after the dispersion and kneading step is cooled to be solidified, it is desirably split into a massive material having a predetermined size. Thereby, the mixture containing the functional fibers dispersed in the prepolymer can be stored for a long time, and handling properties are improved.

[Shaping Step]

The mixture of the prepolymer, the functional fibers and the thickener, whose melt viscosity has been adjusted to the above range after the dispersion and kneading step, may be shaped in the same manner as in the above-described first production process.

EXAMPLES (Measurement of Limit PV Value)

The surface pressure was increased every 5 minutes or 10 minutes at a fixed rate in a ring-on-disk system shown in FIG. 1 by using a thrust type abrasion tester based on JIS K 7218 (plastic sliding friction testing method), a time when frictional force sharply rose, remarkable deformation occurred or abrasion powders were produced was taken as a limit time, and the product of a surface pressure (P) before one at the limit time and the velocity (V) was taken as the limit PV value. Limit PV value measurement conditions
Test speed; 0.5 m/s, initial surface pressure; 0.5 MPa
Surface pressure step: 0.5 MPa/10 min (~10 MPa)
1 MPa/10 min (10 MPa ~)
Mating material: S45C ring, surface roughness Ra of 0.8 μm, outer diameter of 25.6 mm, inner diameter of 20 mm (contact surface of 2 cm$^2$)
Test environment: 23±2° C., 50% RH±5% RH
Test machine: EMF-III-F frictional wear test machine of A & D Company, Limited.
(Dispersion of Fibers)

The existence and nonexistence of the unevenly distributed fibers were checked by observing the cross section of a molded article visually or through a scanning electron microscope (S-3400N of Hitachi High-Technologies Corporation). ○ indicates that the fibers are dispersed and X indicates that the fibers precipitate.
(Measurement of Warpage)

Figure 2:
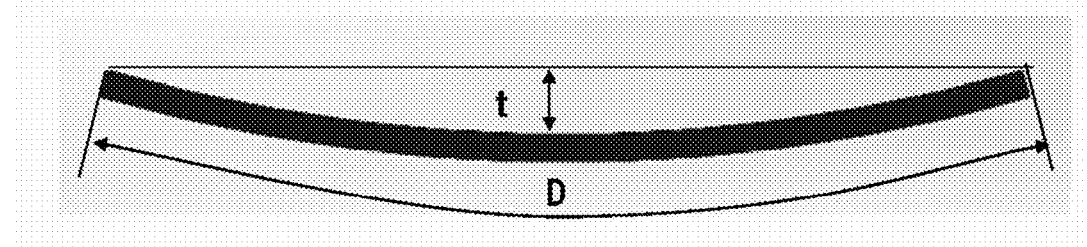
FIG. 2 is a diagram for explaining the method of measuring the amount of warpage in Examples.

The warpage/diameter ratio was calculated from the following equation (1) by measuring the warpage "t" (mm) of a test sample shown in FIG. 2 and the diameter "D" (mm) of a product.

Warpage/Diameter ratio (%)=$t/D \times 100$ t: warpage of test sample (mm), D: diameter of product (mm)

As for judgement on whether the warpage/diameter ratio is acceptable or not, ○ indicates that the ratio is less than 1.5% and X indicates that the ratio is 1.5% or more.
(Measurement of Melt Viscosity)

The melt viscosity at 310° C. was measured with a rheometer (ARES of TA Instrument). The measurement mode was set to dynamic frequency dispersion, the angular frequency was set to 0.1 to 500 rad/s, and the melt viscosity at 0.1 rad/s was measured.

Example 1

11.1 parts by weight of pitch-based carbon fibers (K223HM of Mitsubishi Plastics Inc.) having an average single fiber length of 200 μm was mixed with 100 parts by weight of an addition polymerization type polyimide (PETI-330 of Ube Industries, Ltd.), and the resulting mixture was melt kneaded by means of a kneader under atmospheric pressure at 280° C. for 30 minutes. Thereafter, the mixture cooled to room temperature (bulk molding compound, to be abbreviated as "BMC" hereinafter) was obtained. The obtained BMC was split to a size which was easily handled, kept in an electric furnace at 310° C. for 30 minutes, quenched and pulverized again to obtain a resin mixture (viscous BMC) which was then kept in a mold for a compression molding machine at 280 to 320° C. for a fixed amount of time to be molten and soaked, then heated up to 371° C. at a temperature elevation rate of 3° C./min and kept at that temperature for 60 minutes while a pressure of 2.4 MPa was applied thereto, and gradually cooled to obtain a plate having a diameter of 40 mm and a thickness of 3 mm. The obtained plate material was cured at 357° C. for 6 hours and cut to a desired size to obtain a test sample.

Example 2

42.9 parts by weight of pitch-based carbon fibers (K223HM of Mitsubishi Plastics Inc.) having an average single fiber length of 200 μm was mixed with 100 parts by weight of an addition polymerization type polyimide (PETI-330 of Ube Industries, Ltd.), and the resulting mixture was melt kneaded by means of a kneader under atmospheric pressure at 280° C. for 30 minutes. Thereafter, BMC cooled to room temperature was obtained. The obtained BMC was split to a size which was fit in a mold, kept in a mold for a compression molding machine at 280 to 320° C. for a fixed amount of time to be molten and soaked, then heated up to 371° C. at a temperature elevation rate of 3° C./min and kept at that temperature for 1 hour while a pressure of 11 MPa was applied thereto, and gradually cooled to obtain a plate having a diameter of 100 mm and a thickness of 3 mm. The obtained plate material was cured at 357° C. for 6 hours and cut to a desired size to obtain a test sample.

Example 3

The procedure of Example 2 was repeated except that the amount of the carbon fibers was changed to 100 parts by weight.

Example 4

The procedure of Example 1 was repeated except that BMC was not kept in an electric furnace at 310° C. Since the obtained resin molded article warped, the front and rear surface layers were shaved to obtain predetermined parallelism so as to measure the limit PV value. Although the limit PV values of the surfaces before shaving were not measured, when the measured surfaces were observed, a large amount of the carbon fibers was apparently existent as compared with the surfaces before shaving. It is understood from this that a predetermined amount of the carbon fibers is needed on the surface.

Comparative Example 1

The procedure of Example 2 was repeated except that the carbon fibers were not used.

Comparative Example 2

The procedure of Example 2 was repeated except that the amount of the carbon fibers was changed to 233 parts by weight. The viscosity of BMC obtained after melt kneading was high, stretch insufficiency was partly observed in the mold in the shaping step, and the limit PV value could not be measured.

The measurement results of the limit PV value, the existence and nonexistence of the thickening step, the dispersion state of the fibers and the existence of a defect in the molded articles of the test samples obtained in Examples 1 to 4 and Comparative Examples 1 and 2 are shown in FIG. 4.

Example 5

The procedure of Example 1 was repeated except that BMC was heated at 310° C. for 45 minutes in the electric furnace.

Example 6

The procedure of Example 1 was repeated except that BMC was heated at 310° C. for 60 minutes in the electric furnace.

Comparative Example 3

The procedure of Example 1 was repeated except that BMC was heated at 310° C. for 15 minutes in the electric furnace. BMC leaked from the mold, and warpage deformation occurred due to the uneven distribution of the fibers.

Comparative Example 4

The procedure of Example 1 was repeated except that BMC was heated at 310° C. for 75 minutes in the electric furnace. The resin viscosity was too high that the resin did not stretch and could not be shaped.

The measurement results of the shapability, the dispersion state of the fibers, the warpage/diameter ratio and the melt viscosity of each of the test samples obtained in Examples 1, 5 and 6 and Comparative Examples 3 and 4 are shown in FIG. 5.

Example 7

12.5 parts by weight of pitch-based carbon fibers (K223HM of Mitsubishi Plastics Inc.) having an average single fiber length of 200 μm and 12.5 parts by weight of graphite powders (070-01325 of Wako Pure Chemical Industries, Ltd.) were mixed with 100 parts by weight of an addition polymerization type polyimide (PETI-330 of Ube Industries, Ltd.), and the resulting mixture was melt kneaded by means of a kneader under atmospheric pressure at 280° C., for 30 minutes. Thereafter, the mixture cooled to room temperature (bulk molding compound, to be abbreviated as "BMC" hereinafter) was obtained. The obtained BMC was split to a size which was fit in a mold, kept in a mold for a compression molding machine at 280 to 320° C. for a fixed amount of time to be molten and soaked, then heated up to 371° C., at a temperature elevation rate of 3° C./min and kept at that temperature for 1 hour while a pressure of 2.4 MPa was applied thereto, and gradually cooled to obtain a plate having a diameter of 40 mm and a thickness of 3 mm. The obtained plate material was cured at 357° C. for 6 hours and cut to a desired size to obtain a test sample.

Example 8

The procedure of Example 7 was repeated except that the amount of the carbon fibers was changed to 28.6 parts by weight and the amount of the graphite powders was changed to 14.3 parts by weight.

Example 9

28.6 parts by weight of pitch-based carbon fibers (K223HM of Mitsubishi Plastics Inc.) having an average single fiber length of 200 μm and 14.3 parts by weight of PTFE powders (KT-600M of Kitamura Limited) were mixed with 100 parts by weight of an addition polymerization type polyimide (PETI-330 of Ube Industries, Ltd.), and the resulting mixture was melt kneaded by means of a kneader under atmospheric pressure at 280° C. for 30 minutes. Thereafter, BMC cooled to room temperature was obtained. The obtained BMC was split to a size which was fit in a mold, kept in a mold for a compression molding machine at 280 to 320° C. for a fixed amount of time to be molten and soaked, then heated up to 371° C. at a temperature elevation rate of 3° C./min and kept at that temperature for 1 hour while a pressure of 11 MPa was applied thereto, and gradually cooled to obtain a plate having a diameter of 200 mm and a thickness of 3 mm. The obtained plate material was cured at 357° C. for 6 hours and cut to a desired size to obtain a test sample.

Example 10

The procedure of Example 9 was repeated except that the amount of the carbon fibers was changed to 14.3 parts by weight and the amount of the PTFE powders was changed to 28.6 parts by weight.

Example 11

The procedure of Example 9 was repeated except that the amount of the carbon fibers was changed to 33.3 parts by weight and the amount of the PTFE powders was changed to 33.3 parts by weight.

Comparative Example 5

After an addition polymerization type polyimide (PETI-330 of Ube Industries, Ltd.) was kept at 280 to 320° C. for a fixed amount of time to be molten and soaked, it was heated up to 371° C. at a temperature elevation rate of 3° C./min and kept at that temperature for 1 hour while a pressure of 11 MPa was applied thereto, and gradually cooled to obtain a plate having a diameter of 100 mm and a thickness of 3 mm. The obtained plate material was cured at 357° C. for 6 hours and cut to a desired size to obtain a test sample.

The measurement results of the limit PV value and the dispersion state of the fibers of each of the test samples obtained in Examples 4, 7 to 11 and Comparative Example 5 are shown in FIG. 6.

Figure 3:
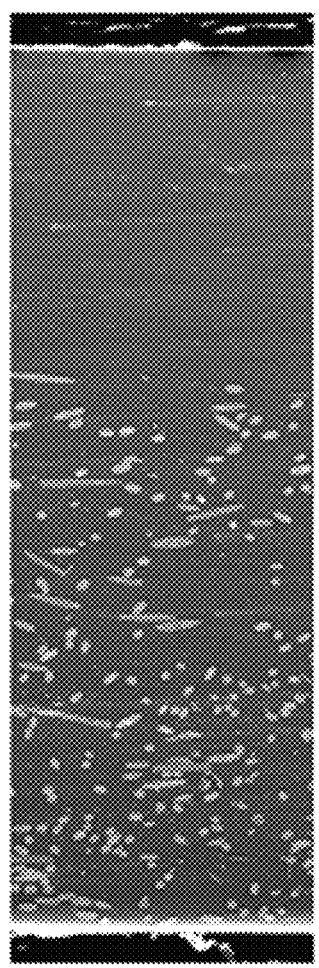
FIG. 3 is a diagram showing the nonuniformity of fibers unevenly distributed.

The dispersion states of the fibers in the test samples which are the same as that of Example 12 except for a plate thickness of 1.5 mm are shown in FIG. 3.

Example 12

The procedure of Example 6 was repeated except that the amount of the carbon fibers was changed to 14.3 parts by weight and the amount of the graphite powders was changed to 28.6 parts by weight.

Comparative Example 6

The procedure of Example 6 was repeated except that the amount of the carbon fibers was changed to 16.7 parts by weight and the amount of the graphite powders was changed to 50.0 parts by weight.

The shapeability, the dispersion state of the fibers and the measurement results of the warpage/diameter ratio and the melt viscosity of each of the test samples obtained in Examples 4, 7 to 9 and 12 and Comparative Example 6 are shown in FIG. 7. As for the warpage of a product, after plate materials were obtained by compression molding in all Examples and Comparative Examples, the warpages thereof were measured before 6 hours of curing at 357° C. to be judged.

INDUSTRIAL FEASIBILITY

Since the resin molded article of the present invention has excellent slidability with a limit PV value of not less than 3,000 kPa·m/s, it can be used for various application purposes as a sliding member in automobile, electric and electronic fields.

The invention claimed is:

1. A resin molded article containing mesophase pitch-based carbon fibers dispersed in a polyimide resin and having a limit PV value of not less than 3,000 kPa·m/s, wherein the polyimide resin is obtained from an imide oligomer precursor having a phenylethynyl addition reaction end group.

2. The resin molded article according to claim 1, wherein the functional fibers contained in a matrix of a composition constituting the resin molded article are impregnated with the polyimide resin.

3. The resin molded article according to claim 1, wherein the functional fibers are contained in an amount of 5 to 200 parts by weight based on 100 parts by weight of the polyimide resin.

4. The resin molded article according to claim 1, wherein a thickener is contained in an amount of 5 to 40 parts by weight based on 100 parts by weight of the polyimide resin and dispersed in the resin molded article.

5. The resin molded article according to claim 4, wherein the thickener is at least one member selected from graphite, molybdenum disulfide, PTFE (ethylene tetrafluoride resin), fine carbon-based materials and metal powders.

6. A process for producing the resin molded article according to claim 1, comprising at least the steps of:
dispersing and kneading a prepolymer comprising the imide oligomer precursor having a phenylethynyl addition reaction end group and mesophase pitch-based carbon fibers at a temperature not lower than the melting point of the polyimide resin formed from the imide oligomer precursor and not higher than the heat curing start temperature of the polyimide resin; and
shaping the resulting mixture at a temperature not lower than the heat curing start temperature of the polyimide resin.

7. The production process according to claim 6, comprising a thickening step of increasing the viscosity of the kneaded product obtained in the dispersion and kneading step by keeping the kneaded product at a temperature not lower than the heat curing start temperature of the polyimide resin for a fixed amount of time between the dispersion and kneading step and the shaping step.

8. The production process according to claim 7, wherein the melt viscosity of the mixture is adjusted to 10 to 5,000 Pa·s at a temperature of 300 to 320° C. in the thickening step.

9. The production process according to claim 7, wherein the kneaded product is kept at a temperature of 310±10° C. for 30 to 60 minutes in the thickening step.

10. The production process according to claim 6, wherein the content of the functional fibers is 5 to 200 parts by weight based on 100 parts by weight of the polyimide resin.

11. The production process according to claim 6, wherein the melt viscosity of the mixture obtained after the dispersion and kneading step is 10 to 5,000 Pas at a temperature of 300 to 320° C., and the mixture is pressure shaped after it is cooled, pulverized and mixed.

12. The production process according to claim 6, wherein the shaping step comprises compression molding.

13. A process for producing the resin molded article according to claim 1 containing 5 to 200 parts by weight of mesophase pitch-based fibers and 5 to 40 parts by weight of a thickener dispersed in 100 parts by weight of polyimide resin, comprising the steps of:
dispersing and kneading a prepolymer of the polyimide resin having a phenylethynyl addition reaction end group, the mesophase pitch-based fibers and the thickener at a temperature not lower than the melting point of the polyimide resin formed from the prepolymer and not higher than the heat curing start temperature of the polyimide resin; and
pressure shaping the mixture obtained after the dispersion and kneading step at a temperature not lower than the heat curing start temperature of the polyimide resin.

14. The production process according to claim 13, wherein the melt viscosity of the mixture obtained after the dispersing and kneading step is 10 to 5,000 Pa·s at a temperature of 300 to 320° C.

* * * * *